United States Patent
Tippmann

Patent Number: 6,152,024
Date of Patent: Nov. 28, 2000

[54] APPARATUS AND METHOD FOR PRODUCING A FOOD PRODUCT

[76] Inventor: Eugene R. Tippmann, 10801 Pine Mills Rd., Ft. Wayne, Ind. 46845

[21] Appl. No.: 09/168,569

[22] Filed: Oct. 9, 1998

Related U.S. Application Data

[60] Division of application No. 08/921,668, Sep. 2, 1997, which is a continuation-in-part of application No. 08/601,604, Feb. 14, 1996, Pat. No. 5,662,959, which is a division of application No. 08/310,756, Sep. 26, 1994, abandoned.

[51] Int. Cl.[7] .............................. A47J 27/04; A21B 1/08
[52] U.S. Cl. ............................. 99/472; 99/474; 99/482; 126/369; 219/401; 219/492
[58] Field of Search ............................. 99/481, 482, 474, 99/472, 467; 126/369; 219/401, 492, 400

[56] References Cited

U.S. PATENT DOCUMENTS

| | | |
|---|---|---|
| 1,960,516 | 7/1934 | Taylor . |
| 2,352,590 | 4/1944 | Trinkle . |
| 3,770,459 | 11/1973 | Gast . |
| 3,800,778 | 4/1974 | Lohr et al. . |
| 3,885,053 | 5/1975 | Townsend . |
| 3,889,013 | 6/1975 | Moule . |
| 3,896,242 | 7/1975 | Moore . |
| 4,011,805 | 3/1977 | Vegh et al. . |
| 4,058,635 | 11/1977 | Durth . |
| 4,137,337 | 1/1979 | Lohr et al. . |
| 4,173,215 | 11/1979 | Bureau et al. . |
| 4,256,775 | 3/1981 | Kunz . |
| 4,303,683 | 12/1981 | Taylor . |
| 4,344,973 | 8/1982 | Blake et al. . |
| 4,363,263 | 12/1982 | Williams . |
| 4,455,924 | 6/1984 | Wenzel ........................................ 99/333 |
| 4,528,975 | 7/1985 | Wang . |
| 4,582,047 | 4/1986 | Williams . |
| 4,588,598 | 5/1986 | Griffith et al. . |
| 4,657,765 | 4/1987 | Nicholson et al. . |
| 4,660,542 | 4/1987 | Scherer . |
| 4,721,623 | 1/1988 | Coffey et al. . |
| 4,753,809 | 6/1988 | Webb . |
| 4,810,510 | 3/1989 | Lever et al. . |
| 4,869,163 | 9/1989 | Haskins ..................................... 99/482 |
| 5,147,671 | 9/1992 | Winkler . |
| 5,235,903 | 8/1993 | Tippmann ................................. 99/331 |
| 5,397,582 | 3/1995 | Underwood et al. . |
| 5,501,142 | 3/1996 | Bailey ....................................... 99/482 |
| 5,662,959 | 9/1997 | Tippmann . |

FOREIGN PATENT DOCUMENTS

| | | |
|---|---|---|
| 2306642 | 12/1976 | France . |
| 2618981 | 2/1989 | France . |
| 2411676 | 9/1975 | Germany . |
| 2720838 | 11/1978 | Germany . |
| 1642978 | 4/1991 | Switzerland . |
| WO 84/02824 | 7/1984 | WIPO . |

OTHER PUBLICATIONS

European Search Report dated Jan. 5, 1999.

*Primary Examiner*—Reginald L. Alexander
*Attorney, Agent, or Firm*—Sixbey, Friedman, Leedom & Ferguson; Donald R. Studebaker

[57] ABSTRACT

An apparatus and method of producing a food product is disclosed. The food product is placed inside of an air-tight chamber, in which the food product is to be cooked, wherein steam is generated from a source of water and is introduced into the cooking chamber. The steam heats the inside of the cooking chamber and serves as a heat transfer media to heat the food product as well as a color and flavor transfer media to color and flavor the food product. That is, a flavoring and coloring additive, such as liquid smoke, may be added to the water utilized in generating the steam in order to flavor the food product being cooked. The steam then transfers the flavoring and coloring additive to the food product which condenses on the food product adding flavor and color to the food product.

14 Claims, 2 Drawing Sheets

APPARATUS AND METHOD FOR PRODUCING A FOOD PRODUCT

This Application is a Divisional of application Ser. No. 08/921,668 filed Sep. 2, 1997 which is a Continuation-In-Part of application Ser. No. 601,604 filed Feb. 14, 1996, now U.S. Pat. No. 5,662,959, which is a Divisional Application of application Ser. No. 310,756 filed Sep. 26, 1994 now abandoned.

BACKGROUND OF THE INVENTION

1. Technical Field

The present invention relates to an apparatus and method of producing a food product and in particular an apparatus for enhancing the flavor and color of the food product.

2. Background Art

Traditionally, boneless meat products, such as hams, have been cooked in large smoke houses to provide additional flavor to the ham. The meats are usually placed in porous bags which allow the smoke flavor in the smoke house to penetrate through the bag and into the meat product itself. During the cooking operation, the high temperature in the smoke house causes the fiber in the meat to shrink inducing the juices in the meat to purge to the surface of the meat. The juice in the meat generally consists of water, animal protein, and salt. The water contained in the juice on the surface of the meat evaporates away during the cooking process, which leaves behind a residue of protein and salt. The protein and salt residue is exposed to the high temperatures of the smoke house which cause the residue to coagulate, thus forming a skin on the surface of the meat.

The resulting skin on the surface of the meat is usually harder than the rest of the cooked meat product. Such a hardened skin is generally undesirable in taste and appearance to most consumers, especially when the meat product is used as a sandwich meat.

One current method of coloring a food product is disclosed in U.S. Pat. No. 4,721,623 to Coffey et al. This reference discloses cooking a meat product in an environment sufficiently humid to reduce the evaporation of water contained in a coloring spray which is used within the environment. However, this process is to be used in conjunction with a meat product having a skin on its surface. Therefore, the process allows some evaporation within the environment and does not disclose an environment having 100% humidity which prevents any evaporation of water. Further, as noted, the coloring process includes spraying the meat product directly with an atomized caramel coloring which merely results in coating the food product which can only be sold as a "color added" food product.

The use of steam as a heat transfer medium is well known in the prior art. Such steam cooking devices may employ the steam at atmospheric pressure as in U.S. Pat. No. 4,011,805 with convection heat transfer. Steam as the heat transfer medium at substantially atmospheric pressure with forced convection heat transfer is also known from U.S. Pat. No. 4,173,215. In this last patented arrangement, water is introduced into the bottom of a steam chamber and a heat source outside that chamber heats the water to produce steam. The chamber is vented so as to maintain the pressure within the cooking vessel at substantially atmospheric pressure. Such steam cooking devices may also employ the steam at an elevated pressure as in the common "pressure cooker." U.S. Pat. No. 3,800,778 discloses a steam cooker with a valve and pump arrangement so that the pressure within the cooking vessel can be maintained either above or below atmospheric pressure. However, these references do not disclose steam cooking food products at 100% humidity, which, if prepared in such manner, would ensure that a skin will not develop on the outer surface of the food product during the cooking process. Moreover, there is no discussion of adding color or flavor to the cook product.

International Publication No. WO84-02824 discloses an induction smoke generator and method of producing natural smoke for use in cooking devices. Therein, the apparatus and method for smoke treating food products includes an inductively heated hollow member which is raised to a sufficiently high temperature so as to vaporize an injected water/smoke mixture. This vaporization occurs when the liquid smoke mixture contacts the walls of the heatable hollow member. This method of treating a food product in order to enhance the flavor of the food product is well known.

Processes which are generally known for smoke treating or coloring various items including food products include the burning of wood chips or saw dust which emitt natural smoke, atomizing liquid smoke concentrate and mixing with water for spraying into a smoke room which is kept at an elevated temperature and spraying liquid smoke onto a heated plate which vaporizes it into a gaseous state.

The natural, wood burn technique while potentially the best processes is generally inconsistent in its results. Additionally, this process is relatively expensive compared to others. Food products flavored and colored using natural wood burning techniques are relatively expensive in that utilizing such a technique is time consuming and requires frequent cleaning to remove ash and cinder from the associated combustion chambers.

A liquid smoke/water mix method reduces the inconsistency problem but is inadequate for treating certain food products due to the likelihood of spotting of the product by water droplets formed in the treating chamber.

Spraying liquid smoke onto a heated plate is a process which is frequently utilized, however, this process eventually results in a caking of the plate and decreasing efficiency of the process as well as down time required for cleaning the plate. Further, the power requirements are extremely high making it a less desirable approach in view of increasing energy costs.

Additionally, the Food and Drug Administration requires that food products which are treated be labelled as including either artificial flavor or naturally smoked flavor. In the latter two examples set forth hereinabove, these products must be labeled as including artificial color and flavor. Clearly, it is a perceived marketing advantage to be able to label your product as being "naturally smoked".

One process which while not being a natural or wood burning technique is disclosed in International Patent Publication No. 84/02824 and results in a process wherein the food product may be labeled as being naturally smoked, however, this process requires a heat source in addition to the heat source used in cooking the food product as well as an atomizer which requires a control system so as to properly expel the liquid smoke/water mixture into the hollow member.

Clearly, there is a need for a method and apparatus for cooking a meat product without resulting in an increase in processing cost while allowing the food product to be labeled as "naturally smoked".

SUMMARY OF THE INVENTION

It is a primary object of the present invention to overcome the aforementioned shortcomings associated with the prior art.

Another object of the present invention is to provide an apparatus and method of producing a food product, wherein the food product is cooked and flavored in a manner so as to permit both "natural smoked flavor" and "natural coloring" to appear on the package label.

Yet another object of the present invention is to provide a meat product, and an apparatus and method of producing the same where the meat product is cooked within a chamber in which the amount of water evaporation from the meat product can be regulated.

A still further object of the present invention is to provide a process and apparatus for cooking a food product and flavoring and coloring such food product without significantly increasing the production costs of the food product.

These as well as additional objects and advantages of the present invention are achieved by preparing a meat product wherein the meat product is heat treated to have little, if any, outer skin about its surface. The meat product is placed inside of an air-tight chamber, in which the meat product is to be cooked. Steam is generated from a source of water and is introduced into the cooking chamber, wherein the steam heats the inside of the cooking chamber and serves as a heat transfer media to heat the meat product. The steam and pressure within the cooking chamber are regulated so as to create an atmospheric humidity of 100% within the chamber, so any water present within the meat is prevented from evaporating into the atmosphere of said cooking chamber.

The pressure within the cooking chamber can be reduced so as to produce a controlled temperature steam from 160° to 212° F. to cook the meat product. Cooking the meat with a low temperature steam assists in preventing the outer surface of the meat from cooking faster than the inside portion of the meat. Additionally, a flavored ingredient, such a liquid smoke, may be added to the water utilized in generating the steam in order to flavor the meat product being cooked.

In the case where a thin skin on the surface of the meat product is desired, the pressure within the cooking chamber can be further reduced after the steam has been heat treating the meat product for a predetermined time period. The reduction in pressure causes the boiling temperature within the cooking chamber to drop, which allows any moisture present on the surface of the meat product to boil off leaving behind a protein and salt residue. The protein and salt residue, being exposed to the heat within the cooking chamber, coagulates so that a thin layer of skin will develop on the surface of the meat product.

The above noted method is carried out using an apparatus for cooking the meat product including an air-tight cooking chamber, a meat product support for supporting the meat product within the chamber, a source of steam and a control unit for maintaining a humidity level of 100% within the chamber. The apparatus further includes one of many devices for reducing the pressure within the chamber so as to control the cooking temperature within the chamber, and preferably includes the addition of liquid smoke to the source of steam so as to produce a food product having both enhanced flavor and color.

Using steam as the transfer media has many advantages because of the unique characteristics of steam. There are preferably three ways that steam can be used to transfer liquid smoke flavor and coloring to the food product. First, when steam is used as the heat transfer media the liquid smoke could be added to the water used to generate the steam or added to the steam directly. Because the food product is at a lower temperature than the cooking chamber, the steam condenses on the surface of the food product thus depositing the smoke flavor and the color on the surface of the food product. Different amounts of smoke flavor and color can be added to the food product being cooked by changing the amount of liquid smoke added to the steam. Second, in food processing plants where smokehouses are used to cook food products moisture is added into the cooking chamber to raise the relative humidity. The relative humidity is raised in the cooking chamber high enough to cause the dew point temperature to be higher than the surface temperature of the food product, this causes the moisture in the air to condense on the food and add heat. The liquid smoke could be added to this steam and when it condenses on the surface of the food product would add smoke flavor and coloring to the food product. Third, some cooking applications call for steam to be added to higher temperature baking and roasting ovens. Liquid smoke added to this steam and would cause the smoke flavor and color to be added to the products being cooked in the oven. Each of these processes would result in a smoked food product which can be marketed as a "naturally smoked" food product.

These as well as additional advantages of the present invention will become apparent from the following detailed description of the invention.

DETAILED DESCRIPTION OF THE PREFERRED EMBODIMENT

Figure 1:
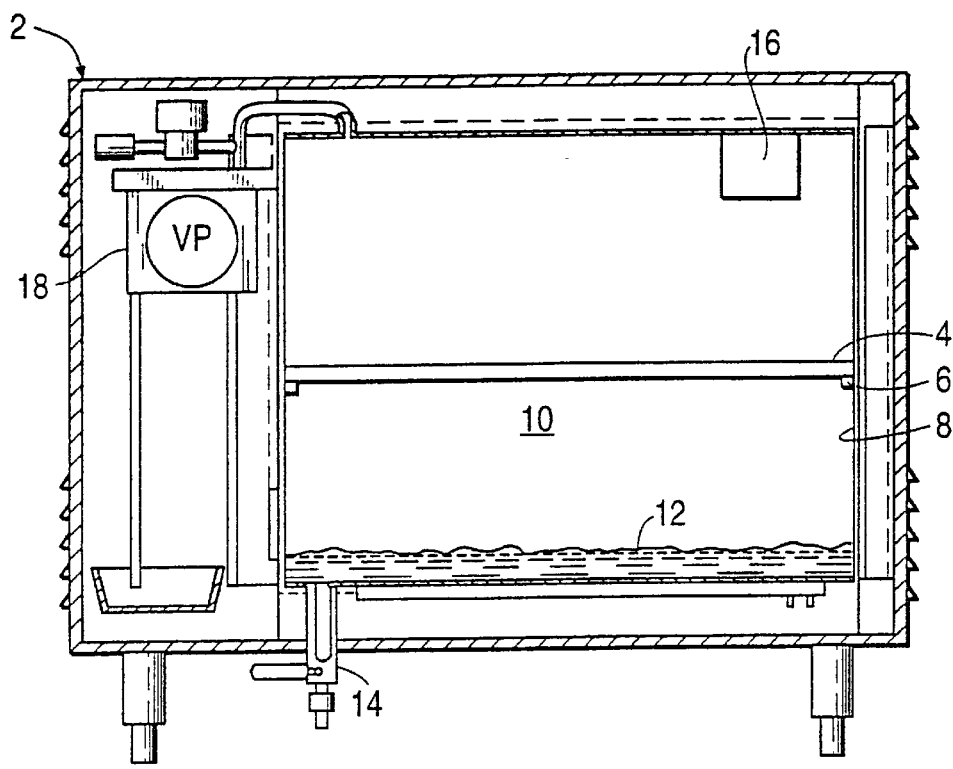
FIG. 1 is a sectional view of the steam cooker of the present invention.

The present invention provides for a new method of cooking a food product. The food product of the present invention may be any meat which tends to obtain a skin thereon during conventional cooking, including pork, beef, and poultry. The food product may also be any other type of food product wherein it is desired to add smoked flavor or color to the food product. is The process of preparing the meat product without a skin formed thereon comprises the steps of placing a meat product into a steam cooker, circulating steam within the steam cooker to heat the meat product, and creating an atmospheric humidity of 100% within the steam cooker.

Once placed within the steam cooker, the meat product is exposed to steam, which adds heat to the meat product in order to cook such product. The steam cooker may be a conventional steam pressure cooker, in which a single meat product, such as a ham, may be placed therein and may be used in the consumer's home. Alternatively, the steam cooker may include a large-scale cooking chamber wherein a plurality of meat products may be placed, such as a smoke house. An air-tight chamber is formed within the steam cooker, so that the atmospheric environment within the chamber may be controlled.

The amount of steam which is introduced into the chamber is regulated to maintain the level of atmospheric humidity within the chamber at 100%. In addition to providing a humid environment within the chamber, the steam is also used to cook the meat product by serving as a heat transfer media to heat the meat product. As the temperature of the meat product rises, some of the juice within the meat product is purged to the surface. The juice, comprising water, animal protein, and salt, builds up on the surface during cooking and runs off of the meat product taking the salt and protein with it. The water present in the juice cannot evaporate and thus leaves the protein and salt behind, because the steam environment of 100% humidity will not permit water to evaporate within the steam cooker. Unlike previous cooking methods where water is evaporated from the juices leaving a residual of protein and salt behind to form a crust-like skin about the meat product, the meat product formed in accordance with the present invention does not leave the protein and salt behind to be cooked and thus forms a skinless meat product. Therefore, cooking the meat product in atmospheric humidity of 100% ensures that a skin will not develop on the surface of the meat product.

When exposing the meat product within the steam cooker to the high temperatures associated with steam, namely 212° F., the outer surface of the meat product tends to cook quicker than the inner portion of the meat product. In order to ensure that the inner portion of the meat product is adequately cooked, the outer surface of the meat product is often overcooked. Therefore, the process of cooking the meat product of the present invention may further include the step of placing the meat product into a reduced pressure steam cooker, wherein the meat product is subjected to a low temperature steam. Through lowering the pressure within the steam cooker, it is possible to obtain a steam having a lower temperature. Subjecting the meat product to a low temperature steam ensures that the meat product is more evenly cooked from its inner portion to its outer surface. This results in a higher quality meat product which is not cooked to different degrees within the meat product.

The pressure may be reduced within the steam cooker to regulate the temperature therein within a range from 160° F. to 180° F. The pressure within the steam cooker is adjusted to provide the adequate cooking temperature for the particular meat product being cooked. For instance, a low temperature steam of 165° F. is the optimal temperature when cooking a boneless ham. Depending upon the texture and thickness of the meat product being cooked, the temperature of the steam can be adjusted accordingly.

Another step in the process of preparing the skinless meat product may include the addition of a flavoring ingredient to the water which is used for generating the steam. Thereupon, the flavoring ingredient will be carried by the steam in the steam cooker, such that, as the steam is heating the meat product, the flavoring ingredient will be disseminated throughout the steam and absorbed by the meat product. Therefore, the meat product can be flavored as it is being cooked. Any flavoring ingredient which may suitably be added to the water and carried by the steam may be used, such as liquid smoke, garlic, or onion flavoring.

In the instances when it is desirous to have a small amount of skin on the meat product, such as with hotdogs and the like, a further step may be added to the cooking process which creates a slight skin on the meat product. A small amount of skin could be formed by stopping the steam supply and reducing the internal pressure within the chamber after the meat product is fully cooked, in order to cause the water contained in the juice on the surface of the meat product to boil off leaving a protein and salt residual behind. Therefore, after the meat product is cooked in an atmospheric humidity of 100% until it is fully cooked, the pressure within the chamber is reduced which, in turn, reduces the boiling temperature of water within the chamber. As the boiling temperature drops within the chamber, the water present in the juice of the meat product is now capable of evaporating.

The pressure in the steam cooker could be reduced to produce a slight skin on the meat product through the use of vacuum pump. The introduction of a cold surface into the cooking chamber would also reduce the pressure therein. The cold surface could comprise a pipe coil extending through the cooking chamber, wherein cold water or a refrigerant is circulated through the pipe coil when a reduction in pressure is desired. The cold surface would cause the steam within the cooking chamber to condense and thereby reduce the pressure, resulting in the water on the surface of the meat product boiling off. Alternatively, a spray of cold water into the cooking chamber would also achieve a similar result to the addition of a cold surface herein described.

While the above embodiments for reducing the pressure within the cooking chamber are described above, it is understood that any method of reducing the pressure within the cooking chamber would suffice in allowing the moisture from the meat product to evaporate.

Referring to FIG. 1, the apparatus of the present invention will now be set forth. The meat product may be positioned within steam cooker 2 onto a cooking rack 4. The cooking rack 4 is supported on its ends by protrusions 6 extending from the inner walls 8 of cooking chamber 10. When it is desirous to cook a plurality of meat products within cooking chamber 10, a series of cooking racks 4 may be positioned within the cooking chamber 10, while being spaced apart from each other a distance at least equivalent to the size of the meat product being cooked. In an alternative arrangement, the meat product could be hung within cooking chamber 10, such as by a hook or the like or placed on carts and manipulated within a large smoke house or oven.

The steam used for transferring heat to the meat product is generated by heating the water 12 within cooking chamber 10 to its boiling point by heating element 13. The water 12 is introduced into the cooking chamber 10 through a valve 14, which connects the inner cooking chamber 10 to a source of water. The steam used for cooking may alternatively be generated outside of the cooking chamber 10 and introduced into the cooking chamber 10 through valve 14. The amount of steam to be generated or introduced into cooking chamber 10 is controlled by thermostat 16 which determines the temperature within cooking chamber 10.

A vacuum pump 18 is provided for selectively removing air from within cooking chamber 10 and reducing the pressure therein. Reducing the pressure within the cooking chamber 10 thus reduces the temperature of the steam and eliminates overcooking which causes the meat product to become tough. The ideal temperature for cooking beef is approximately 155° Fahrenheit while the ideal temperature for chicken and pork is approximately 170° Fahrenheit. Consequently it is desirable to maintain the cooking temperature within the cooking chamber 10 in the range of 150° to 180° Fahrenheit. This can be accomplished by controlling the pressure within the cooking chamber 10.

The vacuum pump 18 may also be utilized for instantaneously reducing the internal pressure within the cooking chamber 10 enough to cause the water on the surface of the meat product to boil off leaving a skin behind. The small amount of skin is formed by stopping the steam supply and reducing the internal pressure within the chamber using vacuum pump 18 after the meat product is cooked. This results in the lowering the boiling temperature within cooking chamber 10 to below the boiling temperature of water on the surface of the meat product. Thus, the water contained in the juice on the surface of the meat product will boil off leaving a protein and salt residual behind.

Figure 2:
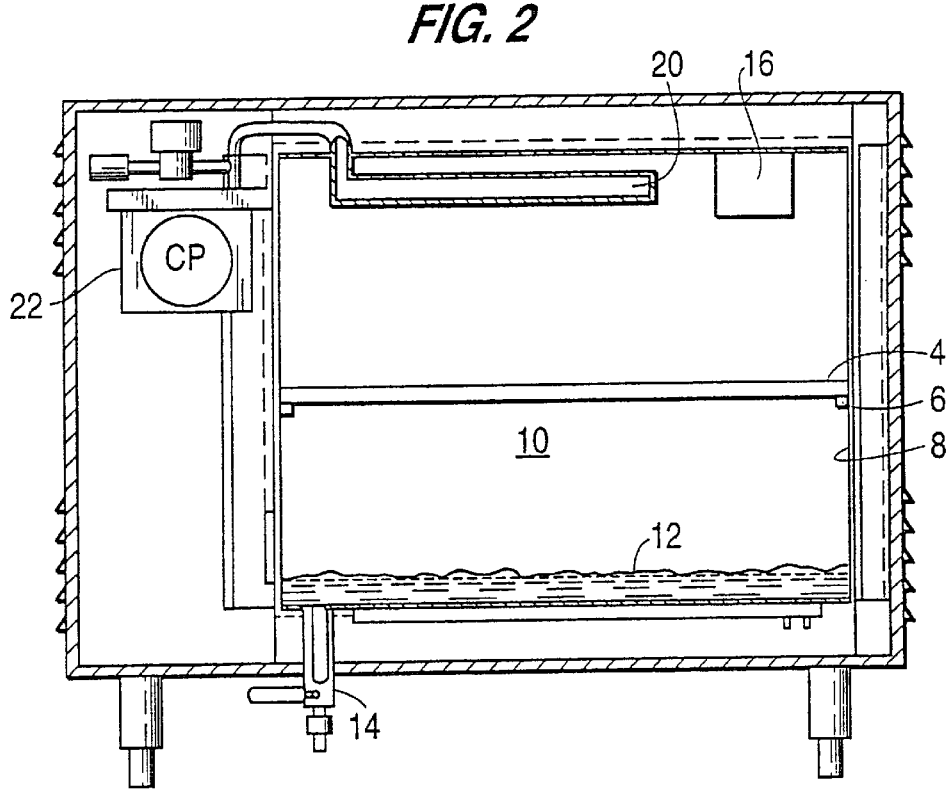
FIG. 2 is a sectional view of a second embodiment of the steam cooker of the present invention.

Referring now to FIG. 2, an alternative embodiment of the present invention is illustrated, wherein a piping tube 20 is positioned within cooking chamber 10 in order to reduce the pressure therein. The piping tube 20 has a refrigerant, such as freon or cold water, circulated therethrough by a circulating pump 22. When the refrigerant or cold water is circulated through piping tube 20, a cold surface within the cooking chamber 10 is created which causes the steam within the cooking chamber 10 to condense, thereby reducing the pressure within the cooking chamber 10. When the supply of steam into cooking chamber 10 has ceased and the refrigerant is introduced into piping tube 20, the further reduction in pressure will result in a drop in the boiling temperature causing the moisture to boil off the surface of the meat product is which then forms a skin thereon. Therefore, piping tube 20 may used to achieve the same result as vacuum pump 18 in controlling the pressure within the cooking chamber 10.

Figure 3:
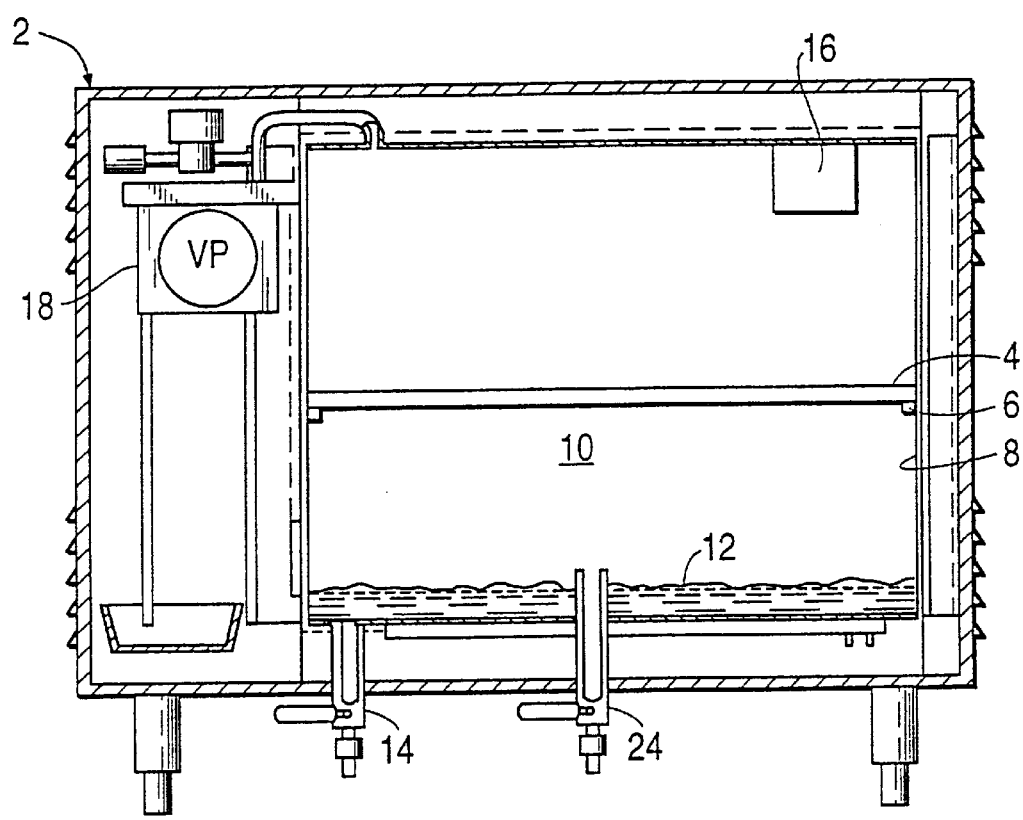
FIG. 3 is a sectional view of a third embodiment of the steam cooker of the present invention.

Referring now to FIG. 3, the pressure within cooking chamber 10 may also be instantaneously reduced by a spray of cold water into the chamber through injection valve 24. Towards the end of the cooking cycle for the meat product, the cold water spray is introduced into the cooking chamber which causes the steam to condense. Thus, the boiling temperature within the cooking chamber 10 will fall and the moisture on the surface of the meat product will boil off leaving the protein and salt residue behind.

A further aspect of the present invention includes using steam as the transfer media for transferring flavoring and coloring to the food product. Using steam as the transfer media has many advantages because of the unique characteristics of steam. There are preferably three ways that steam can be used to transfer liquid smoke flavor and coloring to the food product. First, when steam is used as the heat transfer media the liquid smoke is to be added to the water used to generate the steam or added to the steam directly. Because the food product is at a lower temperature than the cooking chamber, the steam condenses on the surface of the food product thus depositing the smoke flavor and the smoke color on the surface of the food product. Different amounts of smoke flavor and smoke color can be added to the food product being cooked by changing the amount of liquid smoke added to the steam. Second, in food processing plants where smokehouses are used to cook food products, moisture is added into the cooking chamber to raise the relative humidity, The relative humidity is raised in the cooking chamber high enough to cause the dew point temperature to be higher than the surface temperature of the food product, this causes the moisture in the air to condense on the food and add heat. The liquid smoke is to be added to this steam and when it condenses on the surface of the food product will add the smoke flavor and coloring to the food product. Third, some cooking applications call for steam to be added to higher temperature baking and roasting ovens. Liquid smoke, added to this steam, would cause the smoke flavor and color to be added to the products being cooked in the oven. Each of these processes will result in a smoked food product which can be marketed as a "naturally smoked" food product.

As can be seen from the foregoing, a meat product prepared in accordance with the present invention will provide a product which is cooked without forming a skin about an outer periphery thereof. Moreover, by regulating the pressure within the steam cooking chamber, the temperature of the steam in the cooking chamber may be controlled which, in turn, allows the amount of water evaporation from the surface of the meat product to be controlled, thus allowing the formation of a skin on the surface of the meat product to be regulated to its desired level. Further, a food product having a flavor and color additive which still permits the food product to be marketed as "naturally smoked" and "naturally colored" is obtained.

While the present invention has been described with reference to the preferred embodiment, it will be appreciated by those skilled in the art that the invention may be practiced otherwise then as specifically described herein without departing from the spirit and scope of the invention. It is, therefore, to be understood that the spirit and scope of the invention be limited only by the appended claims.

What is claimed is:

1. An apparatus for treating a food product comprising:
a food product treating chamber;
a source of water in communication with said treating chamber;
means for holding said food product in said treating cooking chamber;
a food product enhancing additive in said source of water;
means for generating steam from said source of water and circulating said steam and said food product enhancing additive in said treating chamber for treating said food product, and
pressure control means for reducing the pressure within said treating chamber to produce a low temperature steam within said treating chamber.

2. The apparatus as defined in claim 1, further comprising pressure reduction means for reducing the pressure within the treating chamber allowing moisture to boil of the surface of said food product so that a thin layer of skin will develop thereon.

3. The apparatus as defined in claim 1, wherein said pressure reduction means comprises a vacuum pump.

4. The apparatus as defined in claim 1, wherein said pressure reduction means comprises a tube extending through the treating chamber, wherein a refrigerant is circulated through said tube.

5. The apparatus as defined in claim 1, wherein said pressure reduction means comprises a tube extending through the treating chamber, wherein cold water is circulated through said tube.

6. The apparatus as defined in claim 1, wherein said pressure reduction means comprises a spray of cold water within said treating chamber.

7. The apparatus as defined in claim 1, wherein said food product enhancing additive includes a flavoring ingredient, said flavoring ingredient being carried by said steam into contact with said food product.

8. The apparatus as defined in claim 7, wherein said food product enhancing additive further includes a coloring ingredient.

9. The apparatus as defined in claim 1, wherein said food product enhancing additive includes a coloring ingredient, said coloring ingredient being carried by said steam into contact with said food product.

10. An apparatus for treating a food product comprising:
a food product treating chamber;
means for generating steam from a source of water and directing said steam to said treating chamber;
means for injecting a food product enhancing additive into said source of steam upstream of said treating chamber for treating the food product; and pressure control means for reducing a pressure in said treating chamber for producing a low temperature steam within said treating chamber.

11. The apparatus as defined in claim 10, wherein said pressure reduction means comprises a vacuum pump.

12. The apparatus as defined in claim 10, wherein said food product enhancing additive includes a flavoring ingredient, said flavoring ingredient being carried by said steam into contact with the food product.

13. The apparatus as defined in claim 12, wherein said food product enhancing additive further includes a coloring ingredient.

14. The apparatus as defined in claim 10, wherein said food product enhancing additive includes a coloring ingredient, said coloring ingredient being carried by said steam into contact with the food product.

* * * * *